US007242995B1

(12) United States Patent
Morgenson et al.

(10) Patent No.: US 7,242,995 B1
(45) Date of Patent: Jul. 10, 2007

(54) E-MANUFACTURING IN SEMICONDUCTOR AND MICROELECTRONICS PROCESSES

(75) Inventors: James E. Morgenson, Danville, CA (US); Michael A. Bush, Hudson, OH (US); Donald A. Smith, Cincinnati, OH (US); Karel Stryczek, Boston Heights, OH (US); Michael V. Wood, Buckeye, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/972,643

(22) Filed: Oct. 25, 2004

(51) Int. Cl.
*F06F 19/00* (2006.01)

(52) U.S. Cl. ............... 700/103; 700/97; 700/104; 700/109

(58) Field of Classification Search ........... 700/97, 700/103, 104, 109
See application file for complete search history.

(56) References Cited

U.S. PATENT DOCUMENTS

| | | | |
|---|---|---|---|
| 5,171,393 A | | 12/1992 | Moffat |
| 5,708,798 A | * | 1/1998 | Lynch et al. ............... 703/1 |
| 6,263,255 B1 | | 7/2001 | Tan et al. |
| 6,304,999 B1 | | 10/2001 | Toprac |
| 6,697,690 B2 | * | 2/2004 | Scholl et al. ............ 700/100 |
| 6,697,691 B1 | | 2/2004 | Miller et al. |
| 6,728,588 B2 | | 4/2004 | Cho et al. |
| 6,847,854 B2 | * | 1/2005 | Discenzo ................. 700/99 |
| 2003/0153995 A1 | | 8/2003 | Karasawa |
| 2003/0204528 A1 | | 10/2003 | Su et al. |
| 2004/0225385 A1 | | 11/2004 | Takagi et al. |
| 2005/0027481 A1 | | 2/2005 | Yang et al. |
| 2005/0187649 A1 | | 8/2005 | Funk et al. |

OTHER PUBLICATIONS

American National Standard Document ANSI/ISA-S88.01-1995 entitled "Batch Control Part 1: Models and Terminology," Approved Oct. 23, 1995.*
"Oracle PL/SQL Programming—Chapter 15" http://www.unix.org/ua/orelly/oracle/prog2/ch15_01.htm Copyright 2000.*

* cited by examiner

*Primary Examiner*—Leo Picard
*Assistant Examiner*—Michael D. Masinick
(74) *Attorney, Agent, or Firm*—Amin Turocy & Calvin LLP; William R. Walbrun

(57) ABSTRACT

Architecture that facilitates management of a semiconductor and/or microelectronics manufacturing process. A manufacturing component in communication with the semiconductor and/or microelectronics process operates according to process conditions to output a product, which manufacturing component at least one of monitors and controls the process using modularized code. A rules engine component processes one or more rules in association with the modularized code to control the process conditions in realtime by balancing process efficiency criteria to arrive at an optimal result.

34 Claims, 14 Drawing Sheets

E-MANUFACTURING IN SEMICONDUCTOR AND MICROELECTRONICS PROCESSES

TECHNICAL FIELD

This invention is related to monitor and control systems, and more specifically, to such systems employed in semiconductor manufacturing processes.

BACKGROUND OF THE INVENTION

E-manufacturing is concerned with the use of the Internet and e-business technologies in manufacturing industries, and covers all aspects of manufacturing—sales, marketing, customer service, new product development, procurement, supplier relationships, logistics, manufacturing, strategy development and so on. The Internet also affects products as well since it is possible to use Internet technologies to add new product functions and to provide new services.

New technologies are revolutionizing the way manufacturing and supply chain management is implemented. These changes are delivering manufacturing firms the competitive advantage of a highly responsive supply chain and manufacturing system to ensure that they meet the high expectations of their customers, who, in today's economy, demand absolutely the best service, price, delivery time and product quality.

Manufacturing Execution Systems (MES) provide up-to-the-minute mission-critical information about production activities across the factory and supply chain via communications networks (e.g., Local Area Networks), resulting in the optimization of activities throughout all aspects of the manufacturing process.

In order to remain competitive, semiconductor wafer manufacturers seek to continuously improve overall equipment and manufacturing effectiveness. To facilitate these improvements, IC makers are increasingly implementing computer-based applications to employ such techniques as equipment health monitoring, fault detection and classification, run-to-run control, predictive and preventative maintenance, collection and analysis of data from manufacturing equipment, equipment productivity monitoring, in-line defect monitoring, integrated metrology, the reduction or elimination of non-product wafers, equipment matching, and many others.

A problem with the automation software utilized in the manufacturing equipment for semiconductor and related microelectronics is that existing solutions are created with many lines of custom code or threads written in programming languages such as C, C++, C#, or Java. This programming methodology originated in Research Labs and Universities where the advanced manufacturing processes were developed and proven. These same processes and associated automation software have been moved to manufacturing equipment without change, in an attempt to maintain the original results. Optimization and maintenance of these islands of custom code have created a major obstacle for an information-enabled, high volume manufacturing environment.

At the same time, the industry is attempting to lower costs, reduced time to market, reduced start-up time and, greater reliability and availability of the equipment. The industry is reacting to the need to connect these islands of custom code while optimizing the manufacturing processes. Standards organizations are sponsoring multiple semiconductor specific standards that have been written or are being developed to define an e-Manufacturing environment. This environment focuses on optimizing the manufacturing processes by accessing process data and applying analysis and corrective actions within equipment and across multiple pieces of equipment. This approach, based on extending the existing code base, has created a more complex environment and at this point, not achieving the cost, manufacturing and optimization goals. This problem has not been completely solved to date and the pieces that exist are mainly custom software code.

There is an unmet need in industry to provide improved manufacturing methodologies in the semiconductor and/or microelectronics industry.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention employs global standards, commercial software, a rules engine, and applies the concepts of modularization of re-usable code and a re-usable environment.

The invention disclosed and claimed herein, in one aspect thereof, comprises a system that facilitates management of a semiconductor and/or microelectronics manufacturing process. A manufacturing component in communication with the semiconductor and/or microelectronics process operates according to process conditions to output a product, which manufacturing component at least one of monitors and controls the process using modularized code. A rules engine component processes one or more rules in association with the modularized code to control the process conditions in realtime by balancing process efficiency criteria to arrive at an optimal result.

In another aspect of the subject invention, a standards-based model is employed to modularize the control code into easily testable blocks. By applying and using modules as the building blocks for the application, the user is able to test each of the components, one at a time. This provides a systematic testing protocol. As the solution grows, the higher order modules are built upon tested and approved modules. The testing of the higher order modules is limited to the new code in the higher order modules.

In yet another aspect thereof, a rules-base engine is utilized which accommodates decision making for high-speed processes, as well as steady state and long term projections for high-level process decisions (e.g., minutes, hours, and days between decisions). This high speed decision making capability enables the equipment to achieve faster performance (throughput) for end users. The rules engine provides an environment for sophisticated programming of continuous and discontinuous expert-based decision making procedures in a manner understandable to non-process experts, non-batch experts and non-control experts. This is applicable also to ease of use, system maintainability, repeatability, testability, reduction of complexity, programming/development efficiency.

In still another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
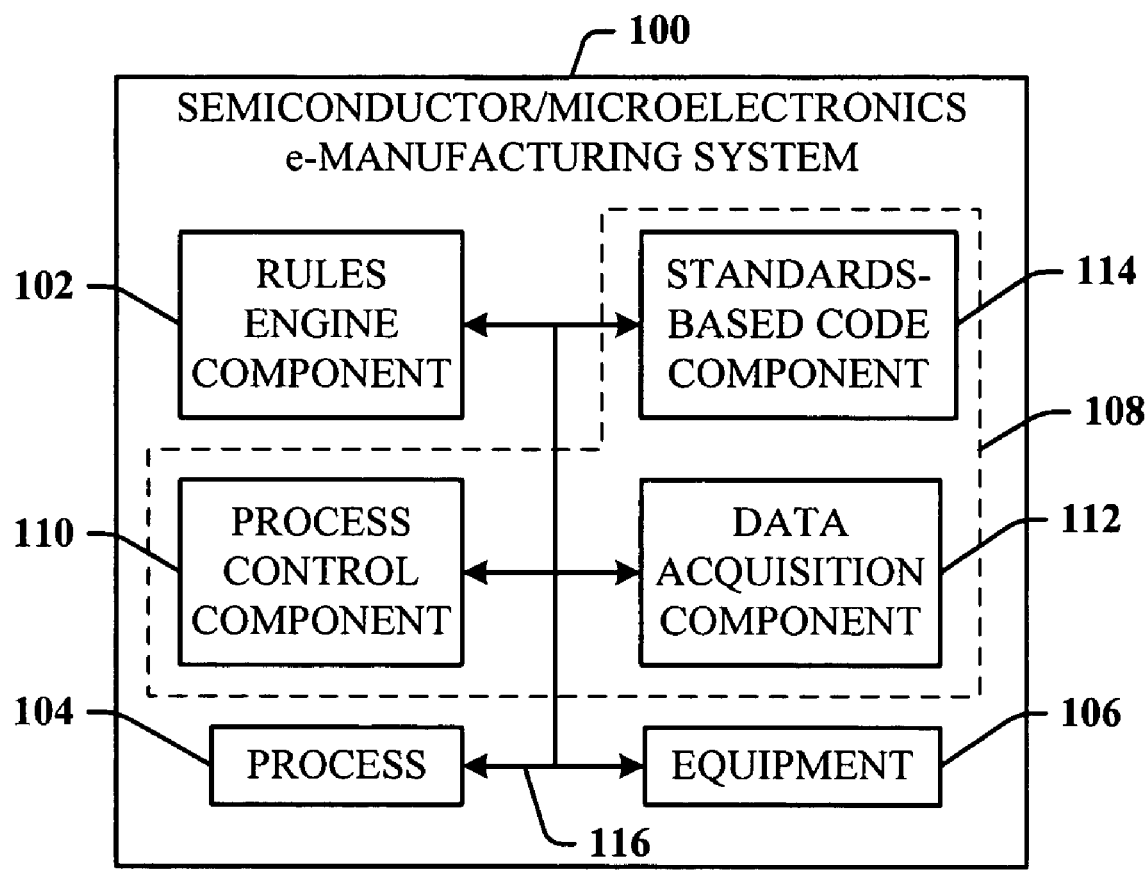
FIG. 1 illustrates a system that employs a rules-based engine for e-manufacturing in a semiconductor and microelectronics environment, in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

e-Manufacturing Architecture

The subject invention achieves improved equipment utilization and product throughput in the semiconductor and microelectronics industry by implementing a smart rules engine in conjunction with the ISA S88.01 International Batch Control Standard (hereinafter "S88"). The rules engine is employed with the standards-based control code in order to optimize the flow of product through an individual piece of equipment or group(s) of equipment. The S88 methodology provides opportunities for modularity and standardization which naturally leads to an object oriented design. Standard valve, instrumentation, and equipment configurations, for example, can be grouped into Equipment Modules (EM) classes and Control Module (CM) classes. The EM is a grouping of CMs that represent process functionality, wherein the CMs are equipment used in the process. A symbol is provided for each state of the EM. The CM provides a symbol for each operator interface (e.g., auto-manual switches), a symbol for each control system input and output, and a definition of the control logic of the CM. Each instance of a module class is easily linked to unique field devices and equipment using aliases.

This innovation utilizes the S88 standards-based model to modularize the control code into easily maintainable modules. Each module has a standard communication protocol to interact with another module. Functionality within the module is documented and isolated from other modules. By separating and isolating the modules, when a change or a problem occurs it is easier to isolate the module that corresponds to the required functional module. The overall solution is assembled from the modular structure. The solution is controlled and monitored by a commercial, S88-based software package.

This standardization starts with the automation software within the manufacturing equipment creating a lower cost, more reliable solution and ends with an interconnected, information enabled manufacturing environment that can utilize process data to optimize the process within a piece of equipment or across multiple pieces of equipment. The innovation brings to the Semiconductor & Microelectronics Industry the following.

Firstly, the invention facilitates standard equipment control methodologies and terminologies for automation software solutions using the S88 modularization practices and methods within the equipment, between like pieces of equipment, and across the manufacturing environment from Facility Applications (FA) to Process Tool and back end test, assembly, and related applications.

Secondly, the invention reduces costs, time to market, and increases reliability by utilizing commercial S88-based software packages to modularize the software code for greater engineering efficiency and quality.

Thirdly, improved equipment utilization and product throughput is achieved by implementing the smart rules engine in conjunction with the S88-based control code in order to optimize the flow of product through an individual piece of equipment or group(s) of equipment. The rules engine utilizes realtime process information and responds to system prompts to make intelligent decisions based on rule sets designed by a process expert and implemented by a control system expert.

Finally, an optimized manufacturing process is achieved by providing realtime streaming manufacturing data to achieve run-to-run comparisons, apply statistical process control, apply Adaptive Control Methodologies, enable e-Diagnostics with Security, and enable Genealogy for each Semiconductor and Microelectronic wafer and/or individual device.

This innovation increases reliability by creating, testing, and implementing S88 control and equipment modules in the controller; the creation of recipes from this point forward is nothing more than linking together pre-tested equipment module logic, thus increasing the overall reliability of the execution layer.

This innovation utilizes the S88 standards-based model to modularize the control code into easily testable blocks. By applying and using modules as the building blocks for the application, the user is able to test each of the components, one at a time. This provides a systematic testing protocol. As the solution grows, the higher order modules are built upon tested and approved modules. The testing of the higher order modules is limited to the new code in the higher order modules.

In addition, by developing and implementing an S88-based library of control code and recipes structures, a uniformed "look and feel" is achieved, not only at the sub-component level, but across the entire piece of equipment, and ultimately from equipment to equipment or machine to machine. Root cause analysis is simplified due not only to the separation of equipment control and recipe execution, but also by the proper abstraction of levels of equipment control inherent to control module and equipment module design. Equipment modules are quickly diagnosed by the level of functionality not being met, where as control modules are the starting point to diagnose specific equipment nonperformance issues.

This innovation separates the physical equipment from the procedural code. The physical equipment is the raw capability of the process. The procedural code determines how the equipment is used. This separation allows for easier first time configuration and subsequent equipment reconfiguration.

Quality is improved through the use of libraries of re-usable modules. The use of pre-tested control code modules from the library reduces coding errors. Plus, using commercial, quality approved software as the top application layer reduces the custom software that must be tested and approved.

S88 modularity provides the framework for precise and repeatable equipment sequencing. The overall architecture insures that each procedure will perform exactly the same way each time it is executed, thereby insuring consistency during each phase of operation.

Processes and process conditions vary over time. The rules-based engine makes intelligent corrections and adjustments of process conditions in realtime. These product quality corrections are designed to compensate for variations of intermediate product quality, such that the final product quality variations are minimized.

The invention increases system efficiency. While maintaining minimal quality variations a fuzzy rule set can be designed and implemented to maximize process efficiency. Process efficiency is defined as one or combinations of product throughput per unit of time, and specific cost of production (raw materials used per unit or product, waste per unit of product, energy used per unit of product). The rules engine has the capability of balancing efficiency criteria to achieve overall optimal result. The uniqueness of the rule based efficiency optimization is in the ability to accommodate uncertain, or "fuzzy" information and make a series of decisions that is the most likely to lead to most efficient operation.

The rules-base engine accommodates decision making for high-speed processes (on the order of about 10 msec per decision), as well as steady state and long term projections for high-level process decisions (e.g., minutes, hours, and days between decisions). This high speed decision making capability enables the equipment to achieve faster performance (throughput) for end users.

The invention increases functionality by applying the S88 architecture at the controller level along with S88-based supervisory software. All equipment functionality is broken down into elementary control and equipment modules. Supervisory execution software is then used to link these equipment modules into deterministic sequences to support the overall product specifications. This separation of equipment control and supervisory execution supports the capability to create any allowable sequencing of events across the equipment, thereby increasing the overall functionality of the tool. Rather then being constrained by conventional "hardwired" sequencing control strategies, the developer and end user now have the flexibility to provide any required sequence of events across the tool.

The rules engine provides an environment for sophisticated programming of continuous and discontinuous expert-based decision making procedures in a manner understandable to non-process experts, non-batch experts and non-control experts. This is applicable also to ease of use, system maintainability, repeatability, testability, reduction of complexity, programming/development efficiency.

This innovation significantly reduces the cost of developing new equipment, maintaining existing equipment, trouble shooting field problems, and retrofitting/updating existing equipment.

The rules-based engine has an excellent cost/performance ratio. Standard PC-based rule development software can be provided with standard PC or industrial PLC-based (Programmable Logic Controller) runtime options. This further reduces the need for any non-standard parts, communications networks, etc., driving the cost lower.

Note that although the description focuses on the S88 architecture, other similar modularization architectures (e.g., object oriented designs) can be employed in combination with the rules-based engine in order to achieve the benefits described herein with respect to the S88 architecture.

In support thereof, FIG. 1 illustrates a system 100 that employs a rules-based engine 102 for e-manufacturing in a semiconductor and microelectronics environment, in accordance with the subject invention. The system 100 includes a semiconductor and/or microelectronics process 104 that is being conducted using process equipment 106 such as wafer inspection machines, process chambers, aligners, and robot arms to move wafers from one station to another, for example. In order to manage the process 104, the system 100 further includes a manufacturing component 108 that interfaces to the process 104 and equipment 106 for monitor and control thereof. The manufacturing component 108 includes a process control component 110 that includes software and/or hardware for controlling the equipment 106 of the process 104. For example, one module of the process control component 110 can be a particular model of a hardware device (e.g., rackmount or standalone) that includes processing capability, memory, firmware, and interface hardware/software that facilitates interfacing to the equipment 106 for control thereof.

The manufacturing component 108 also includes a data acquisition component 112 that can include sensors and hardware/software suitable for instrumenting the process 104 and equipment 106 to take measurements of equipment performance and data before, during, and after performing the process 104. The manufacturing component 108 also includes a standards-based code component 114 (e.g., S88) that allows for development and implementation of modularized code for management of the process 104 and associated equipment 106, the process control component 110, and data acquisition component 112.

The process control component 110 and data acquisition component 112 both interface to the process 104 and equipment 106 across a communications network 116, which can be any conventional wired and/or wireless network. It is to be appreciated by one skilled in the art that the network 116 can also be a combination of networks such that communications between the process 104, equipment 106, process control component 110 and data acquisition component 112 is via a high speed local bus suitably dedicated for data acquisition and control environments, whereas the remaining part of the network 116 is an wired/wireless Ethernet network, or the like.

The system 100 also includes the rules engine 102 that processes rules in support of controlling and/or making measurements associated with the process 104 and/or equipment 106. The rules are processed in accordance with the standards-based code of the code component 114. The rules engine 102 and code component 114 can communicate across the network 116, and with the other entities including, but not limited to the process control component 110, data acquisition component 112, process 104, and process equipment 106.

It is to be appreciated that by way of example, and not by limitation, these are only a few of the entities that can be employed in the system 100. For example, there can be a multiplicity of processes and associated equipment, control, and data acquisition components in the system 100 each or a combination of which are controlled or control related processes. Moreover, the system 100 can be accessed remotely via the Internet or a LAN (Local Area Network), WAN (Wireless Area Network) or the like, by employing secured login procedures to authorized users. Such login can provide read-only access, or even provide full access such that any of the system entities can be manipulated before, during, and/or after performing the process.

Figure 2:
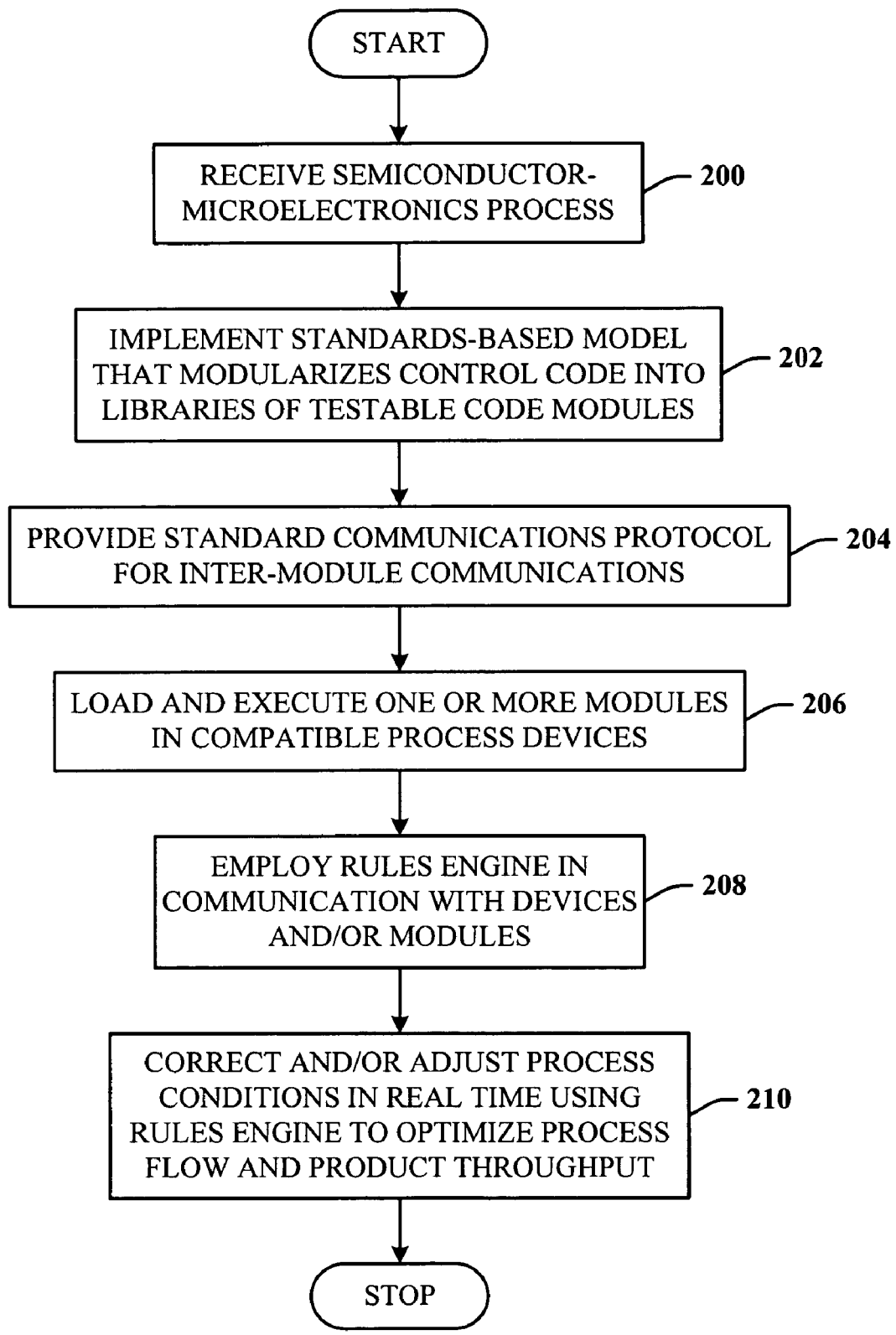
FIG. 2 illustrates a methodology of object oriented and rules-based process monitor and control in accordance with the invention.

Referring now to FIG. 2, there is illustrated a methodology of object oriented and rules-based process monitor and control in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a semiconductor and microelectronics process is received for control and data acquisition. At 202, a standards-based model (e.g., S88) is employed that modularizes control code into libraries of testable code modules. At 204, a communications protocol is provided for inter-module communications, which protocol standardizes communications between most, if not all, of the code modules. At 206, one or more code modules are loaded into compatible process devices for execution to control one or more pieces of process equipment. At 208, the rules engine is employed in communication with devices and/or code modules such that rules which are written can be imposed by execution via the rules engine to make intelligent decisions in realtime associated with, for example, corrections and adjustments of process conditions, as indicated at 210. This facilitates optimization of at least process flow, device use, and product throughput.

Figure 3:
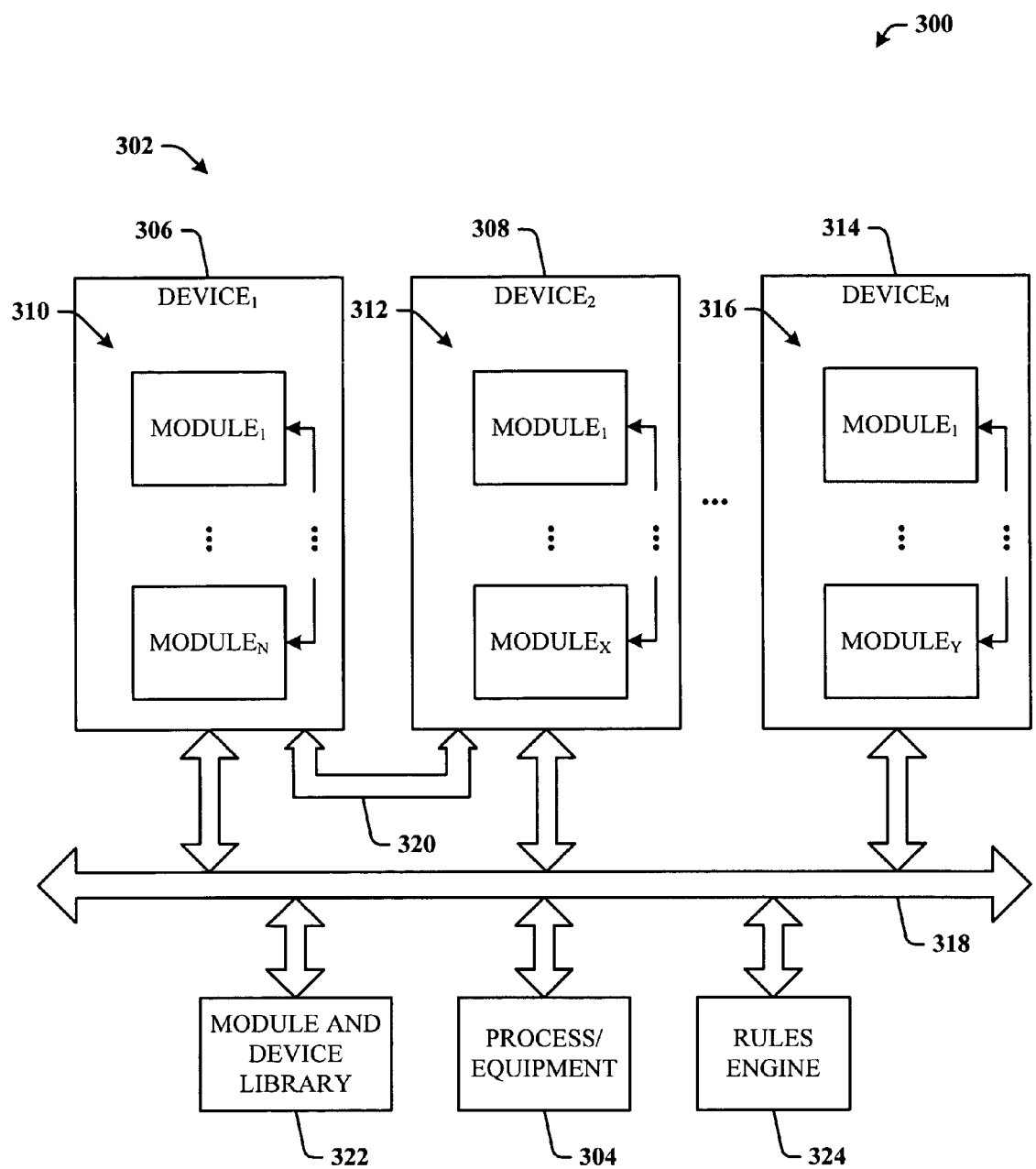
FIG. 3 illustrates a system of devices that can be employed and configured for process control in accordance with the invention.

FIG. 3 illustrates a system 300 of devices 302 that can be employed and configured for process control in accordance with the invention. Depicted is a plurality of the devices 302 (denoted as $DEVICE_1$, $DEVICE_2$, . . . ,$DEVICE_M$) that can be utilized to instrument one or more processes and associated equipment (denoted collectively as 304). Each of the devices 302 can be used for a different purpose. For example, a first device 306 can be used to control a robot arm, and a second device 308 can be configured to monitor and control a process chamber. Accordingly, the first device 306 will be loaded with one or more code modules 310 (denoted as $MODULE_1$, . . . ,$MODULE_N$) that perform dedicated functions for which the first device is assigned. Similarly, the second device 308 can be loaded with one or more code modules 312 (denoted $MODULE_1$, . . . ,$MODULE_X$) that form the modularized code needed for operation and functioning of the second device to monitor and control the process chamber of the equipment/process 304. Furthermore, the system 300 can include an Mth device 314 utilized for data acquisition of various sensor measurements associated with the equipment and/or process 304. Accordingly, the device 314 includes one or more code modules 316 (denoted as $MODULE_1, \ldots, MODULE_Y$) which are uploaded thereinto for acquiring data and operation of the device 314.

The modules 310 of the first device 306 intercommunicate with each other via the standardized communications protocol. Similarly, modules 312 of the second device 306 intercommunicate with each other via the standardized communications protocol, and modules 316 of the Mth device 306 communicate with each other via the standardized communications protocol. It is further to be appreciated that since the code modules (310, 312, and 316) intercommunicate with the standardized protocol, inter-module communications can also occur inter-device. In other words, the first module (denoted $MODULE_1$) of the first device 306 can communicate across a communications network (or bus) 318 to a first module (denoted $MODULE_1$) of the second device 306. Moreover, some of the modules employed in the devices (306, 308, and 314) can be the same. For example, the first modules (denoted $MODULE_1$) of each device (306, 308, or 314) can be code that performs basic setup and configuration of the device, where the devices are the same model, etc. Yet other code modules loaded thereinto facilitate operation and functionality for different purposes related to the equipment and/or part of the process to be instrumented. It is further to be appreciated that inter-device communications can also be by a dedicated inter-device bus 320 to reduce signal and data traffic across the main communications network 318.

In support of code modularization of the subject invention, a module and device library 322 can be disposed remotely on the network 318 such that modules suitable for each device and its assigned instrumentation can be determined and uploaded to the device. For example, the first device 306 can be assigned to monitor and control a piece of process equipment. Accordingly, knowing the device model and its assigned tasks, the module and device library 322 maintains a relationship whereby the device model is known to handle only certain code modules, which modules are customized for that device model. It is to be appreciated that "customization" in this sense provides for "plug-and-play" of the code necessary for performing its assigned tasks. Thus, the compatible modules can be accessed from the library 322 and uploaded into the first device 306 for immediate execution. The modules are pre-tested control code which reduces coding errors. Moreover, this code is introduced as the top application layer reducing the custom software that must be tested and approved.

A rules engine 324 (similar to rules engine 102 of FIG. 1) disposed on the network 318 communicates across the network 318 to one or more of the devices (306, 308, and 314) to make intelligent corrections and adjustments of process conditions in realtime.

Figure 4:
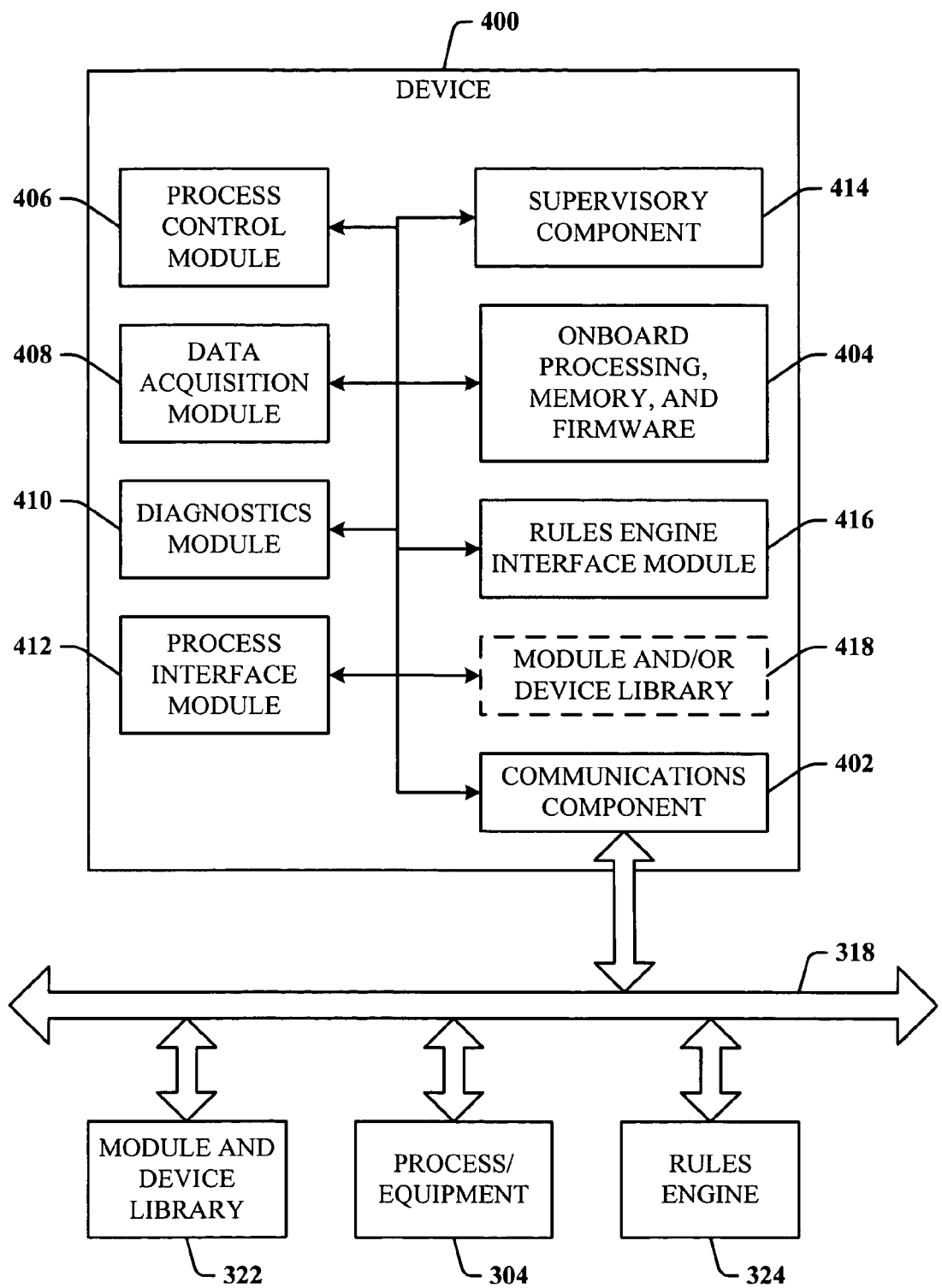
FIG. 4 illustrates a block diagram of a device operable to execute code and rules in accordance with the subject invention.

Referring now to FIG. 4, there is illustrated a block diagram of a device 400 operable to execute code and rules in accordance with the subject invention. Given that a customer can have many different types of devices available for monitor and control of a process and/or related process equipment, modularization of code and supervisory control thereof provides a significant advantage for optimizing product throughput. In support thereof, the device 400 (similar to devices 306, 208, and 314) communicates via the network 318 by way of a communications component 402 with at least the following entities also disposed thereon: the process/equipment 304, module and/or device library 322, and rules engine 324. In order to make the device 400 suitable for the assigned task, one or more of the code modules are uploaded thereinto. For example, the communications component 402 can include a code module that facilitates interface to the network architecture employed. Thus, a selected communications code module can be uploaded from the library 322 into the device communications component 402 to support the network architecture (e.g., Token-ring, Ethernet, wireless, and so on).

Additionally, the device 400 can include basic operational processing logic, memory and firmware 404 that provides onboard processing power, memory storage, and basic start-up configuration and handling information to simply get the device 400 to a basic operational state. In support of assigned tasks, the device 400 can receive a process control module 406 that facilitates control of one or more process variables, a data acquisition module 408 that facilitates data acquisition of desired sensors and other related parameters, a diagnostic module 410 for performing online or offline diagnostics of onboard device circuits and the modules, and a process interface module 412 that provides the interface code for interfacing to the process equipment and/or sensors.

The device 400 also includes a supervisory component 414 that sequences the onboard modules to perform the desired tasks. The supervisory component 414 can also communicate with other supervisory components of other devices (not shown) to facilitate deterministically sequencing of the devices to support the overall product specifications. A rules interface module 416 provides an interface to rules execution onboard the device 400. The rules interface component 416 interfaces to the rules engine 324 to receive and process rules to make corrections and adjustments of the assigned equipment and/or process of the device 400. Rules can also be processed to control the diagnostics module 410 to perform diagnostics.

Optionally, the library 322 or portions thereof can be stored local to the device 400, as indicated at module and/or device library 418. For example, given that the device model is already known, the library of compatible code modules can be uploaded thereto into a no-volatile memory for local access. Thus, communications across the network 318 is minimized, as basic commands need only be transmitted to the device 400 to access and execute the appropriate library modules from the local library.

Figure 5:
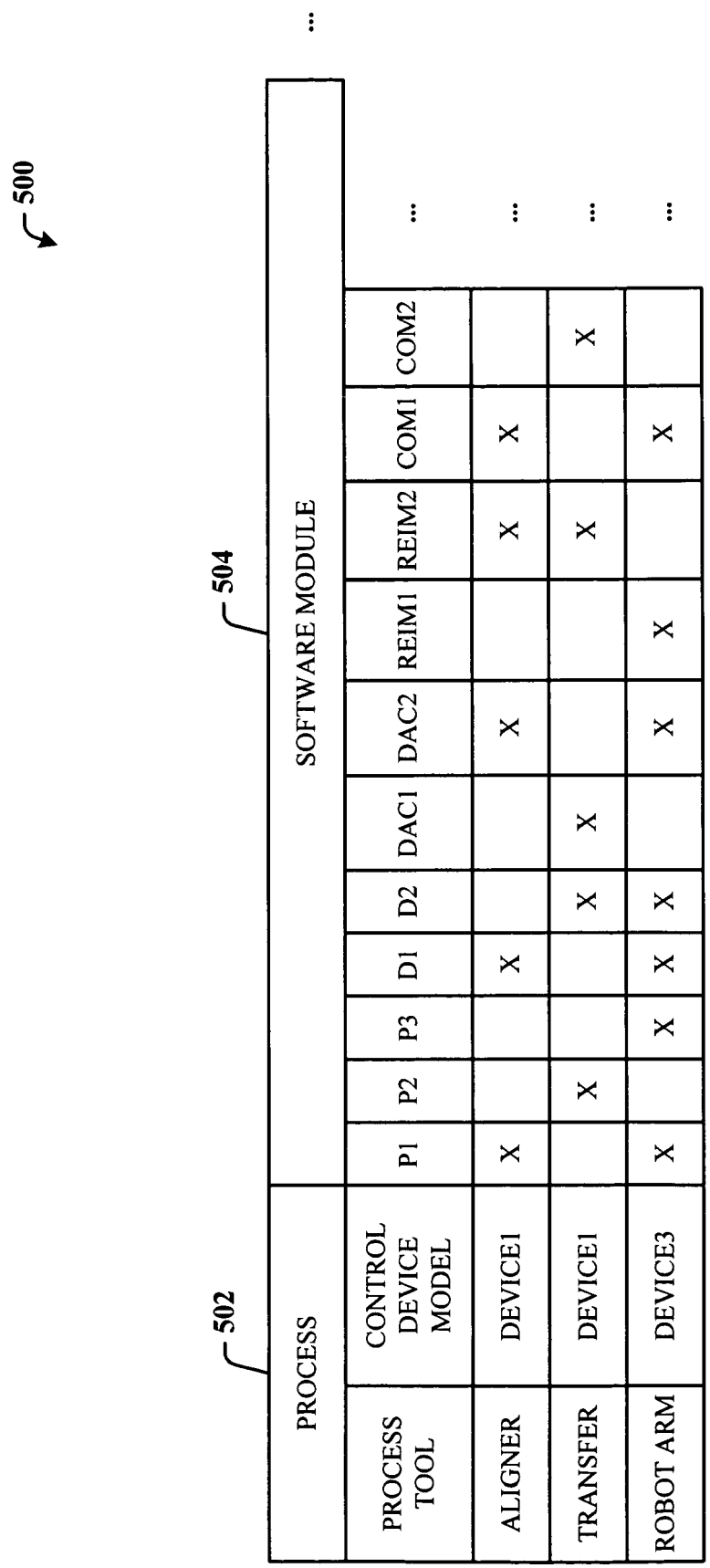
FIG. 5 illustrates an exemplary library mapping that can be accessed to assign code modules to a specific device, in accordance with the invention.

Referring now to FIG. 5, there is illustrated an exemplary library mapping 500 that can be accessed to assign code modules to a specific device, in accordance with the invention. It is to be appreciated that this is only one example, and that other arrangements can be provided without departing from the scope of the subject invention. A process section 502 describes a type of process tool that can be employed, and a device model that can be assigned to the process tool. For example, a customer may upgrade devices and equipment over the years such that several different device models can be available for use with a process. Thus, code modules can be written for the given device model in order to utilize any device for a given process. For example, for an aligner tool, a first control device (denoted $DEVICE_1$) is available by selecting one or more associated software modules, as listed under a Software Module heading 504.

By selecting the available device model, the associated software modules are known and can be quickly uploaded to the associated device for immediate use. Here, the first device is associated with a first process module (denoted P1), a first diagnostics module (denoted D1), second data acquisition module (denoted DAC2), a second rules engine interface module (denoted REIM2), a communications module (denoted COM1), and so on. These software modules can be quickly selected, uploaded, and tested in the first device. Selections for a second process tool (denoted TRANSFER) and a third process tool (denoted ROBOT ARM) can also be made. As noted with the third tool, multiple module types can also be selected for upload to the given device. Here, the third device (denoted DEVICE3) supports two process modules (denoted P1 and P3) and two diagnostics modules (denoted D1 and D2), in addition to other code modules, as desired.

Figure 6:
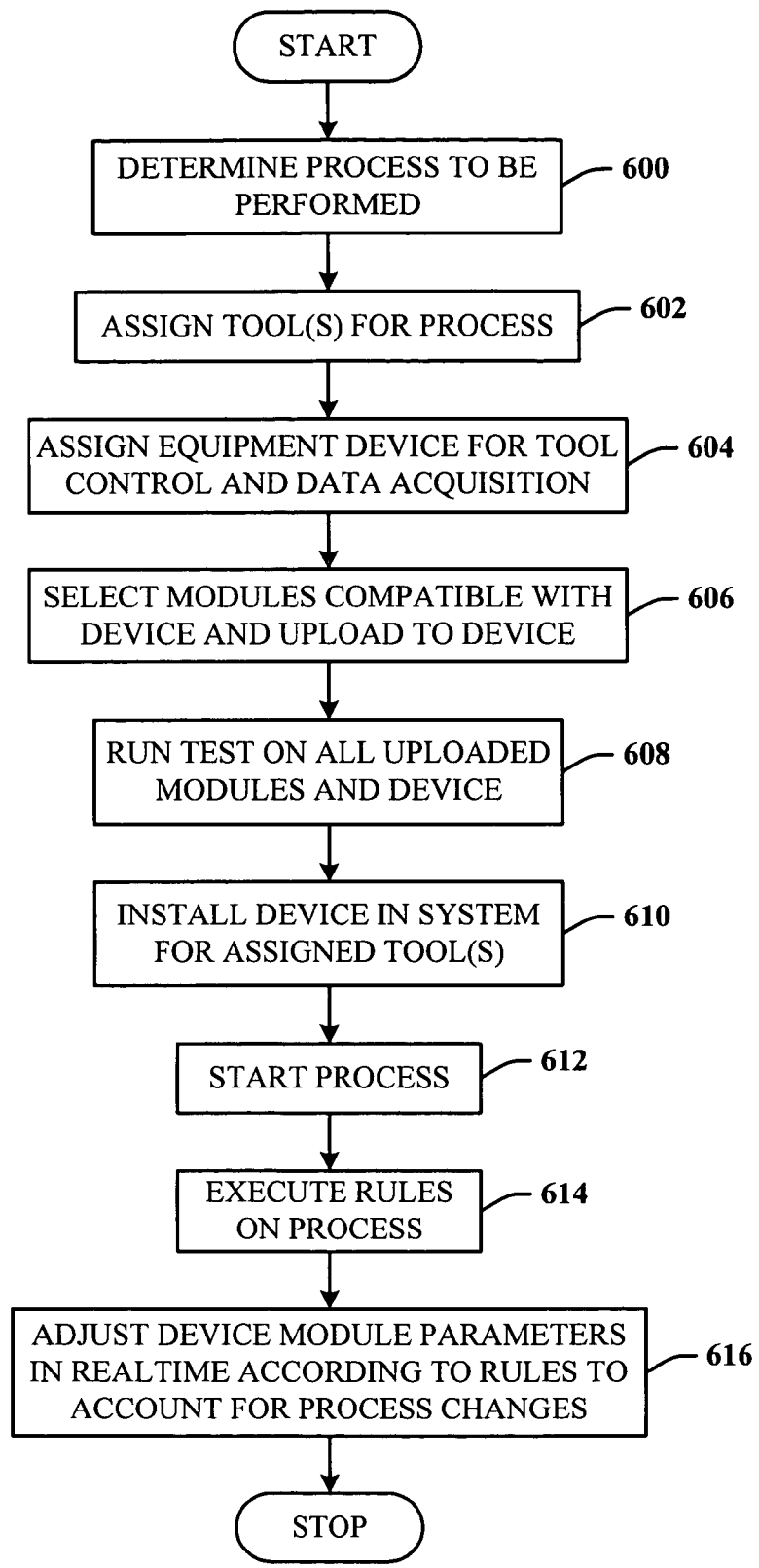
FIG. 6 illustrates a methodology of device preparing and operation for a process in accordance with the invention.

FIG. 6 illustrates a methodology of device preparing and operation for a process in accordance with the invention. At 600, the process to be performed is determined. At 602, one or more tools are assigned to the process. At 604, a device is assigned to the process and/or process equipment for toll control and/or data acquisition. At 606, modules compatible with the selected device are selected and uploaded to the device. At 608, one or more of the uploaded code modules are tested in the device. At 610, the device can then be installed in the system. Note that it is to be appreciated that the device can already be installed in the system such that a tool replacement is required and not the device itself. The process is then started, as indicated at 612. At 614, rules are imposed and executed before, during, and/or after the process runs to make adjustments and/or corrections to optimize system processes, for example. At 616, device software modules parameters can be adjusted in realtime according to the rules to accounts for process changes and/or equipment wear and failure.

Figure 7:
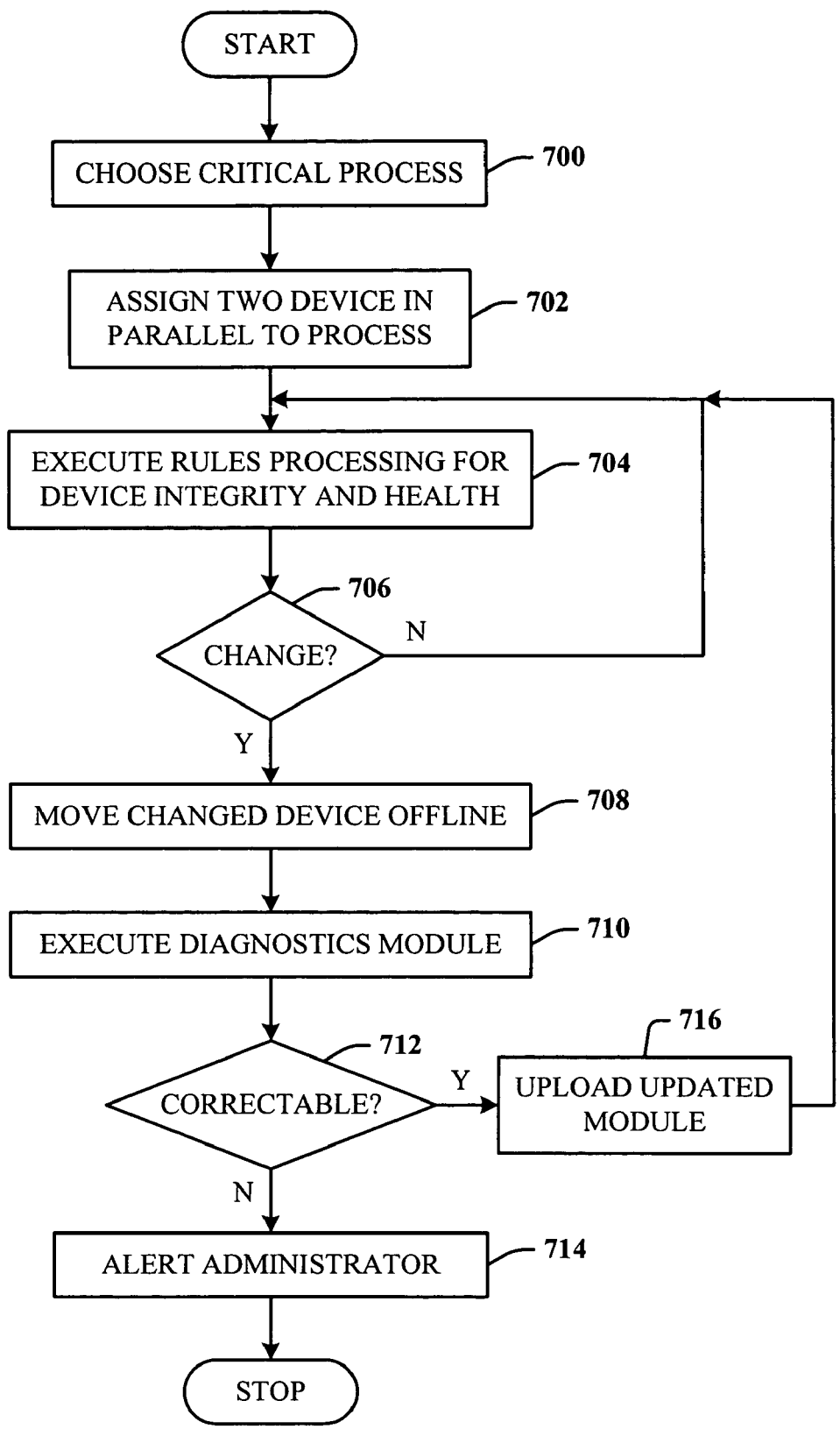
FIG. 7 illustrates a methodology of implementing parallel devices for a critical process in accordance with the invention.

FIG. 7 illustrates a methodology of implementing parallel devices for a critical process in accordance with the invention. At 700, the critical process is determined. At 702, two devices are selected and assigned to the process. Note that the two devices can be the same or different, which is not a limiting factor, since the code modules are optimized for the given device model. Supervisory control exists for any device type, since inter-module communications is according to a standard protocol. At 704, rules are imposed and executed to determine device integrity and health of the device and associated tools and process being controlled and/or monitored. If a change is not detected in a device, parameter, tool or the process, at 706, flow is back to 704 to continue rules execution for determining if changes have occurred. If changes have occurred, flow is from 706 to 708 to, in the worst case, move the affected device offline, leaving the second device online to handle the processing required. While offline, a diagnostics module of the changed device can be executed to determine a cause of the change.

At 712, the system determines according to predetermined criteria, if the problem is correctable. If no, at 714, the device is kept offline, and an alert is sent to an administrator as to the nature of the change or failure and that the device should be replaced, for example. Alternatively, if the problem is correctable, flow is from 712 to 716 to upload an updated module that resolves the problem. Similarly, the updated module can also be uploaded the online device for implementation at a safe time in the process, or thereafter, if needed.

Figure 8:
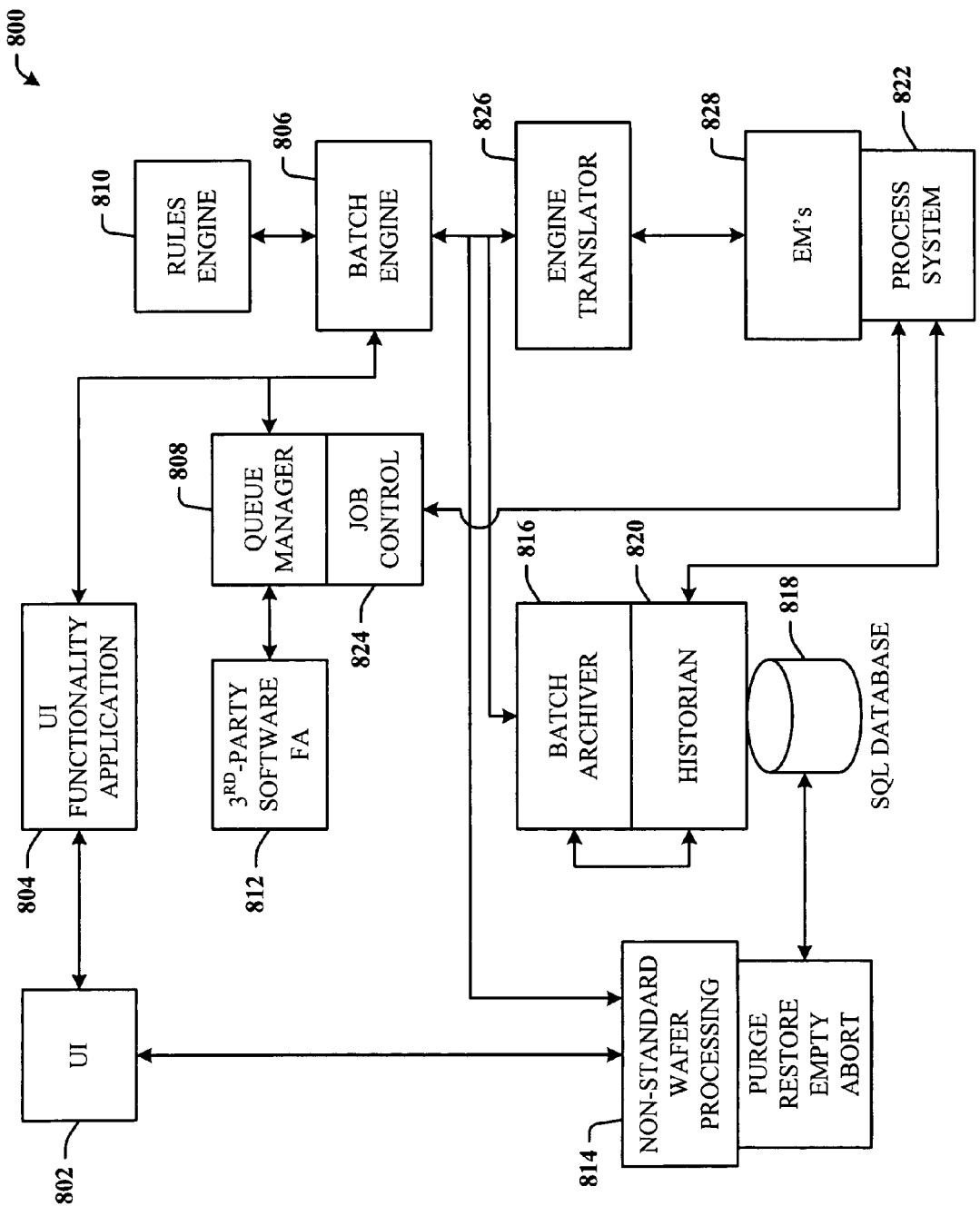
FIG. 8 illustrates a sample process system that employs standards-based code modules and rules execution in accordance with the invention.

FIG. 8 illustrates a sample process system 800 that employs standards-based code modules and rules execution in accordance with the invention. The system 800 includes a user interface (UI) 802 via which a user interacts to monitor the process and all associated parameters, devices, and equipment. The UI 802 communicates with a UI functionality application 804 that interacts with the batch and rules engine process system such that the user can interact therewith. Virtual devices can be created along with selected parameters displayed to provide a virtual storyboard of certain processes in which the user is interested.

The UI application 804 communicates with a batch engine (or server) 806 and a queue manager 808 to issue calls (e.g., Active X and/or API (Application Program Interface)) thereto for the display of data. The batch engine 806 communicates with the queue manager to process job-to-wafer batches on the server and provide status updates. The batch engine 806 interfaces to a rules engine 810 (similar to rules engines 102 of FIG. 1 and rule engines 324 of FIG. 3), which rules engine 810 responds to prompts from the batch engine 806. The queue manager 808 interfaces to a third-party software Facility Application (FA) 812 to control and process job requests.

The batch engine 806 also interfaces to a non-standard wafer processing application 814 that handles non-standard operations associated with purge, restore, empty, and abort, for example. The non-standard wafer processing application 814 interfaces to the UI 802 to pass non-standard event requests thereto. The batch engine 806 also interfaces to a batch archiver 816 that archives batch journals to an associated SQL (Structured Query Language) table of an SQL database 818. A historian application 820 resides interstitial the batch archiver 816 and the database 818 to provide historian functions. For example, the batch archiver 816 makes batch journals available to the historian 820. The non-standard wafer processing application 814 interfaces to the SQL database 818 to retrieve a batch journal for a restore operation.

The historian 820 interfaces to a process system 822 to process data and/or signals of the process system 822 as part of a historical dataset. In one implementation, the process system 822 employs OPC (Object Linking and Embedding for Process Control) technology for communications between the batch engine 806 and process PLCs. Accordingly, the historian 820 interfaces to the process system 822 to process OPC tags for continuous data as part of the historical dataset. OPC is a "plug-and-play" open automation industry standard. Based on the Component Object Model (COM) and Distributed Component Object Model (DCOM) by Microsoft Corporation, Inc., OPC provides the technical basis for the connectivity of automation software with control hardware and field devices. It also provides seamless integration with enterprise-wide MRP (Materials Resource Planning)/ERP (Enterprise Resource Planning), SCADA (Supervisory Control and Data Acquisition) and MES (Manufacturing Execution Systems) systems.

In another implementation, a Control and Information Protocol (CIP) can be used to provide communications between the batch engine 806 and PLCs. In such a scenario, each CIP node is modeled as a collection of objects. An object provides an abstract representation of a particular component within a product. CIP objects are structured into classes, instances, and attributes. Anything not described in object form is not visible through the CIP. It is to be appreciated that other suitable communications protocols can be employed to provide batch engine to process system communications without departing from the scope of the subject invention.

The process 822 also interfaces to a job control block 824 of the queue manager 808 such that clean, stop, and fault requests, for example, can be processed. The batch engine 806 communicates with an engine translator 826 to process batch standard information for phases of the process. The engine translator 826 communicates with EMs (Equipment Modules) 828 to provide translated information in a format compatible to drive tools associated with the process system 822. In the case of OPC, for example, translation is of OPC tags.

Sample Process Project

The project is centered on a standard semiconductor work tool. The tool consists of the following modules: an aligner (denoted ALIGN) that orientates an incoming wafer (e.g., W1); a transfer module (denoted XFER) is a final module that removes the completed wafer from the tool; two modules (denoted PMA_1 and PMA_2) of the same class that provide specific process actions on the wafer; and two modules (denoted PMB_1 and PMB_2) of the same class that provide specific process actions on the wafer which are different from the PMA class modules.

Wafers enter the tool via the Aligner, and go to the first available PMA class module. Inside the PMA module, a set of process actions take place based on the recipe. After completion, the wafer is then moved to the first available PMB class module for further process actions based on the same recipe. After completion, the wafer then exits the tool via the XFER module.

The control recipe is executed by the batch engine for each wafer, and multiple wafers can be expected to be inside the tool at any time. The recipe insures that each wafer has the proper process actions executed and maintains the routing on a class level. There is a single robot arm inside the tool to move each wafer to and from the tool modules, and is also under recipe control.

As the recipe executes for each wafer, there is a point in time where the wafer must be moved from one module to the next. Since the robot arm can only be "owned" by one control recipe at a time, there is a need to coordinate multiple requests for the resource. The batch engine exposes these requests in the format of a prompt. The prompt includes which recipe is making the request along with the required module to which the transfer is made. For this configuration, the rules are as follows: do not let a wafer (or control recipe) acquire the robot arm unless there is a downstream module available. Since execution is asynchronous, a wafer may be ready to move before a downstream module is ready to accept. In this case, if a wafer is moved forward to the robot, and there is no place for it to go, it will "lock" up the tool.

All things being equal, allow the oldest wafer first access to the robot. If there is a downstream module available, and there are multiple requests for the robot, the goal is to allow the oldest wafer (the one that has been in the tool the longest) to move first. This is a very simplified rule set, but demonstrates the interface between the batch engine and the rules engine. The batch engine provides the "prompts" and the rules engine will answer the prompts based on the current rule set.

Figure 9:
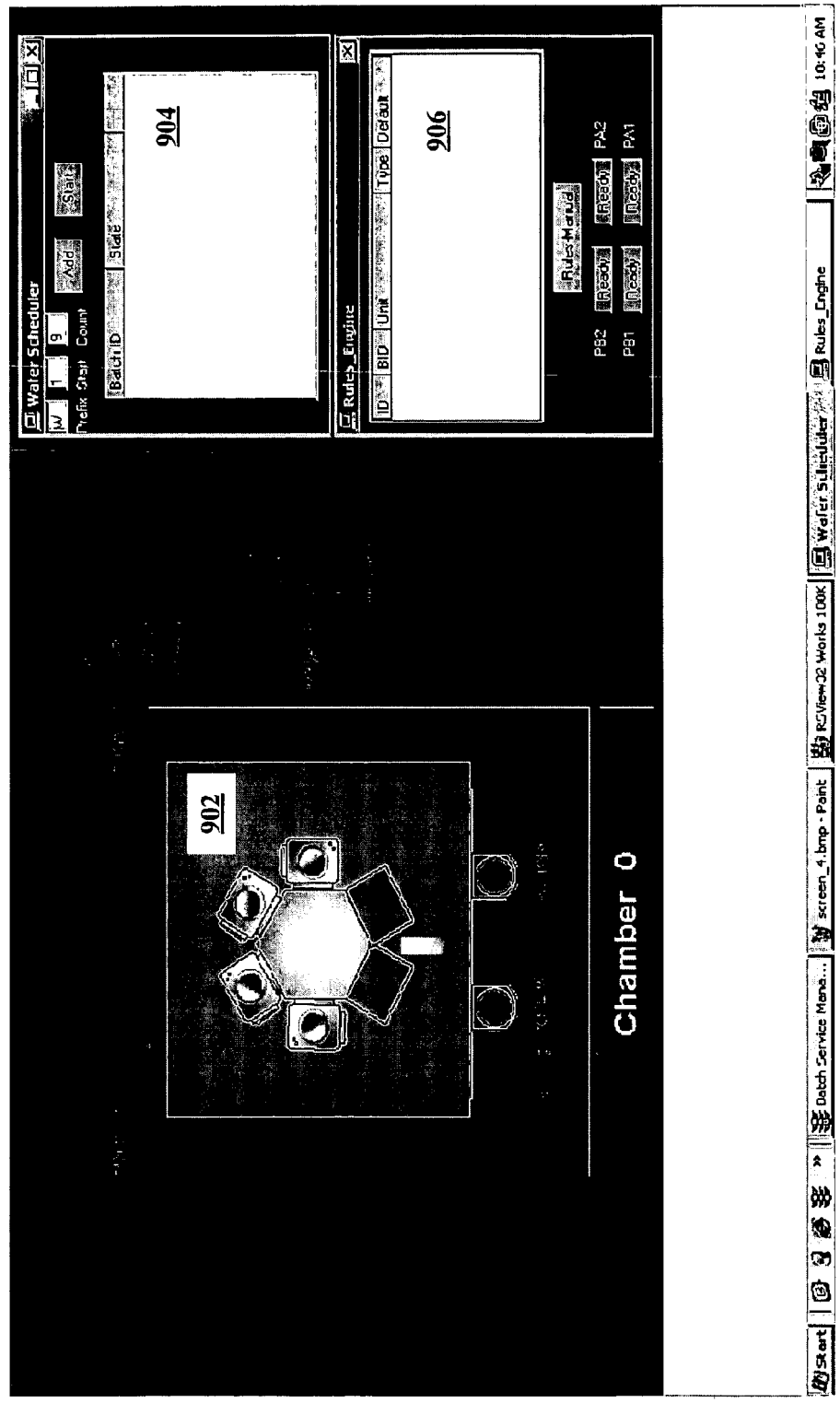
FIG. 9 illustrates a screenshot of a graphical user interface (GUI) representation of a process and associated rules engine and batch code in accordance with one example of the subject invention.

FIG. 9 illustrates a screenshot 900 of a graphical user interface (GUI) representation of a process and associated rules engine and batch code in accordance with one example of the subject invention. The screenshot 900 shows a basic tool layout representation 902 along with the batch engine wafer scheduler window 904, and a visual element window 906 of the rules engine.

Figure 10:
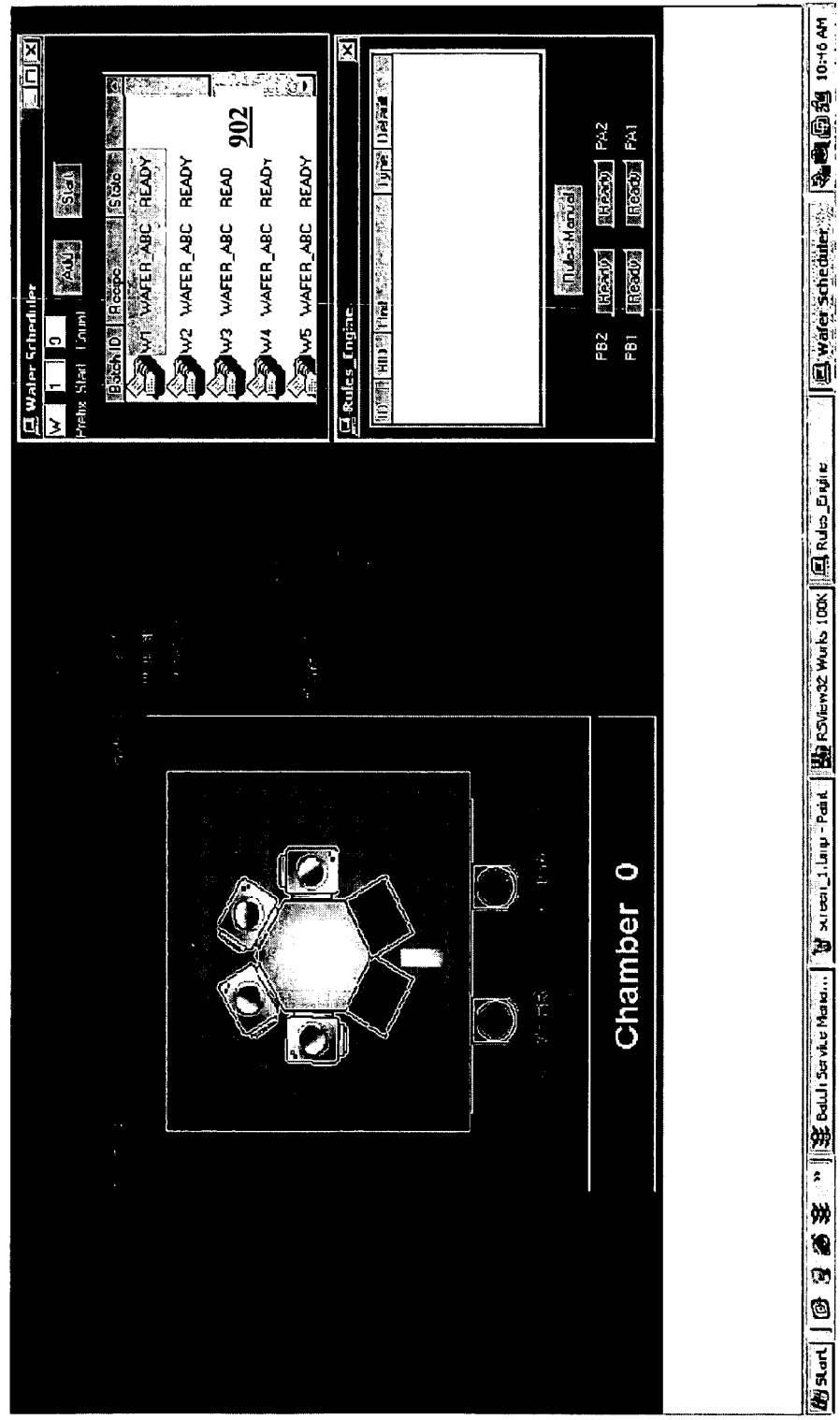
FIG. 10 illustrates a screenshot of a GUI representation of recipes scheduled for execution in accordance with one example of the subject invention.

FIG. 10 illustrates a screenshot 1000 of a GUI representation of recipes scheduled for execution in accordance with one example of the subject invention. Screenshot 1000 shows the recipes (wafers) scheduled on the tool and ready for execution, as indicated in the batch engine wafer scheduler window 904.

Figure 11:
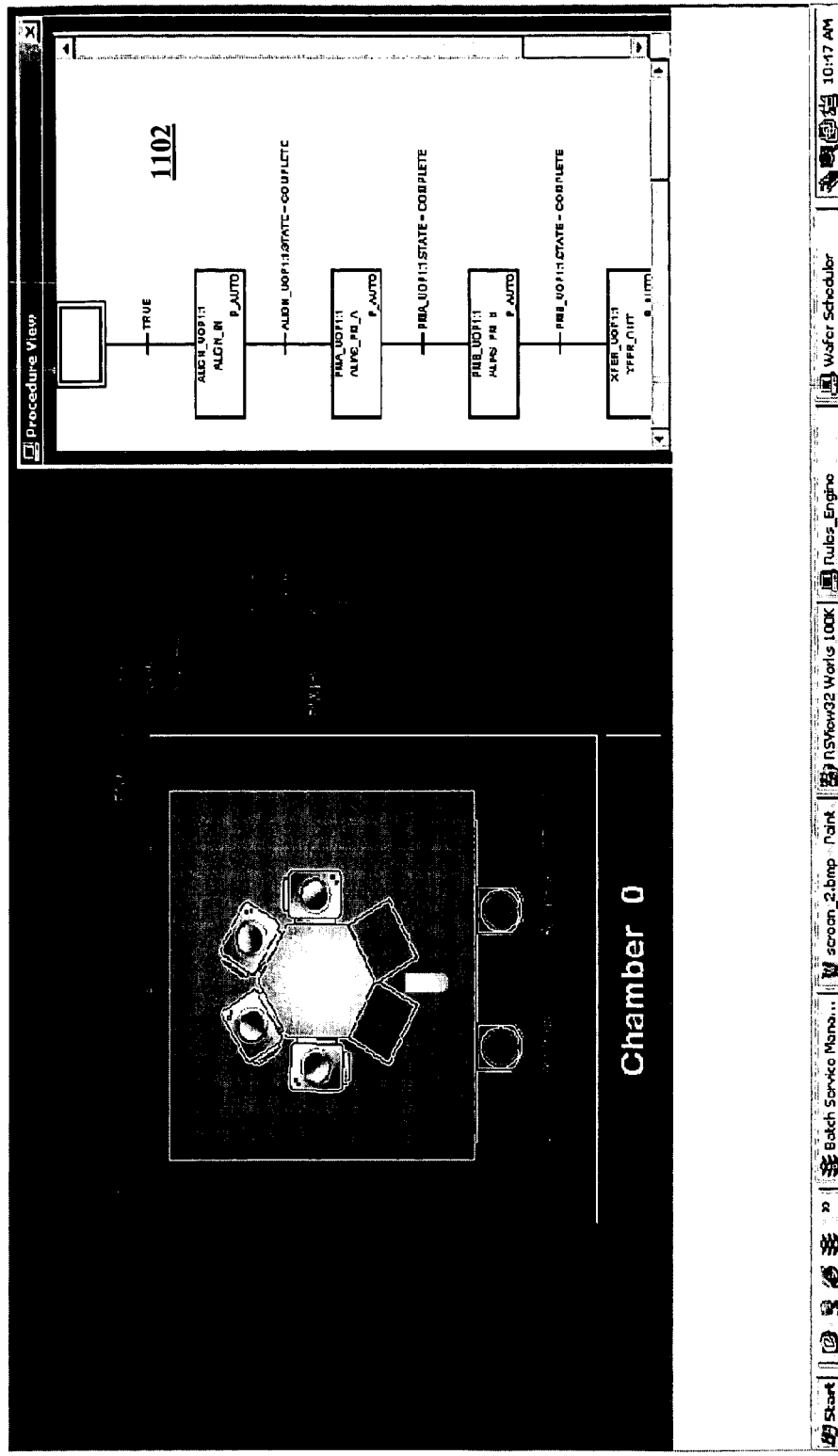
FIG. 11 illustrates a screenshot of a GUI representation of a procedure execution in accordance with one example of the subject invention.

FIG. 11 illustrates a screenshot 1100 of a GUI representation of a procedure execution in accordance with one example of the subject invention. Screenshot 1100 shows the capability of the batch engine to display the current recipe structure for the selected wafer. Realtime feedback is provided of execution of the control recipe in a procedure view window 1102.

Figure 12:
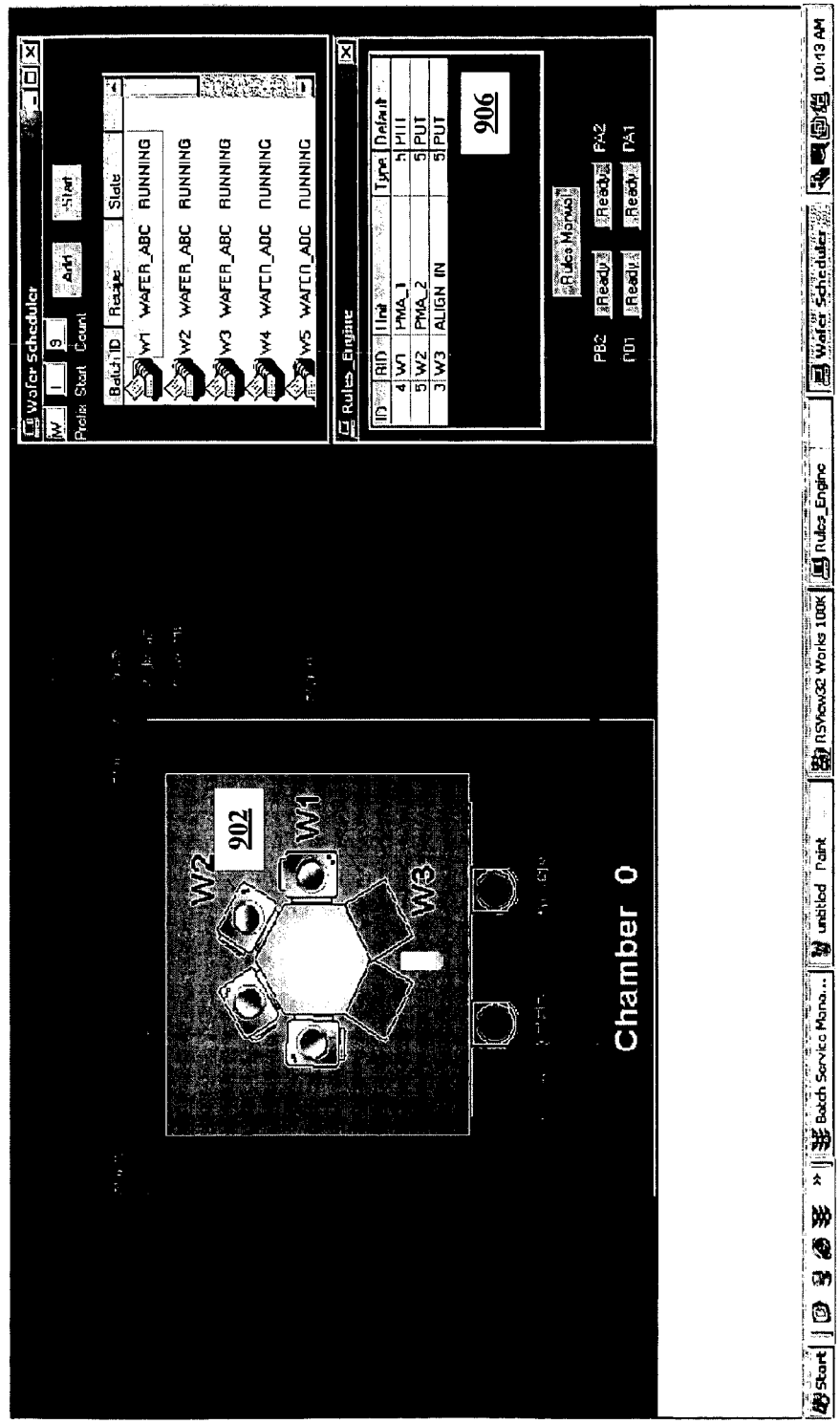
FIG. 12 illustrates a screenshot of a GUI representation of a prompts and responses thereto in accordance with one example of the subject invention.

FIG. 12 illustrates a screenshot 1200 of a GUI representation of a prompts and responses thereto in accordance with one example of the subject invention. Screenshot 1200 shows how prompts are exposed to the rules engine and allows visual feedback in the rules engine window 906 on how the prompts are "answered" by the rules engine. Note that there are three wafers (W1, W2, and W3) currently in the tool, as shown in the tool layout representation 902. W1 has been processed by PMA_1 and is waiting to access the robot arm to move to one of the PMB class modules. W2 has also completed processing in PMA_2 and is waiting to move to one of the PMB class modules. W3 has been serviced by the aligner and now needs to move to one of the PMA class modules. Each of the three wafers has generated a prompt that is visible in the rules engine window 906.

In the current scenario, the results will be as follows: since there is no place for W3 to go, the associated prompt will not be acknowledged. W1 is the oldest wafer, and thus, will be allowed access to the robot arm to be moved to one of the PMB class modules. Once W1 has moved, W2 is older than W3, and so W2 will be allowed to move next. Now that there is a downstream module available, W3 will be allowed to move to the first available PMA class modules. As the prompts in the rules engine window 906 are acknowledged, the prompts are removed from the rules list. The rules list will continue to build as the tool reaches capacity and wafers continue to move in and out.

Figure 13:
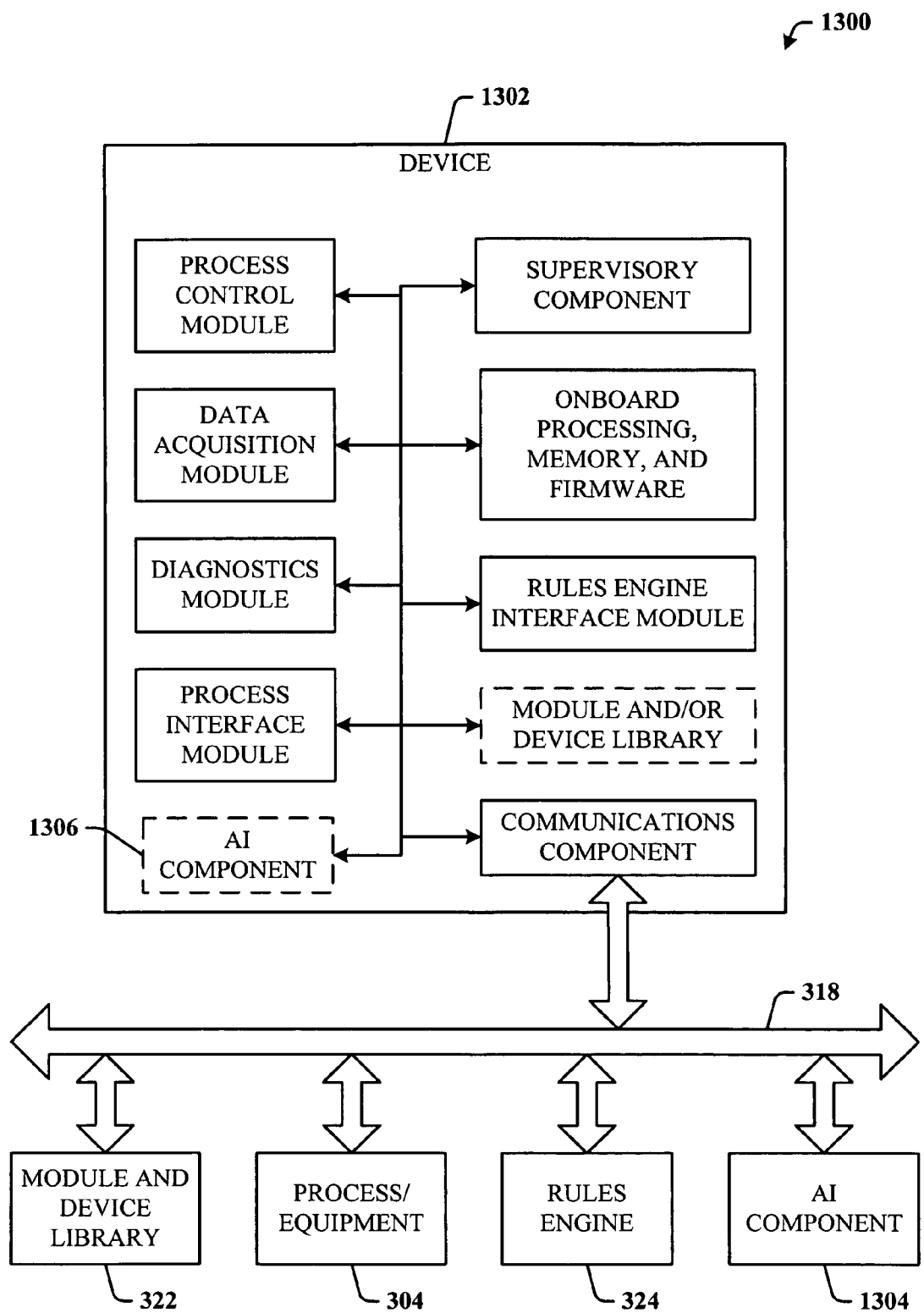
FIG. 13 illustrates a system that employs artificial intelligence (AI) to learn and automate one or more features of the e-manufacturing architecture of the subject invention.

Referring now to FIG. 13, there is illustrated a system 1300 that employs artificial intelligence (AI) to learn and automate one or more features of the e-manufacturing architecture of the invention. The subject invention (e.g., in connection with selection) can employ various AI-based schemes for carrying out various aspects thereof. For example, a process for determining what modules to employ in a device 1302 can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform automatically a number of functions.

In one implementation, an AI component 1304 is disposed on the network 318 in communication with the device 1302 and other devices (not shown), and even the process and process equipment, where desired, such that the type of modules uploaded to a given device can change in accordance with either predetermined criteria or learned criteria. For example, if the device 1302 exhibits drift in a data measurement, as can be associated with a sensor, the AI component 1304 can detect this over time, and automatically perform diagnostics in order to attempt to identify the problem. This can include automatically replacing the existing data acquisition module 408 with a same acquisition module or updated acquisition module, and/or alerting the administrator of the problem. This can also include projecting when the measurement and sensor will exceed acceptable limits of use in the process.

In another implementation, the AI component 1304 can determine which modules operate together in a more optimized manner. For example, it can be determined that the process control module 408 and data acquisition module 408 may or may not operate optimally when hosted in the same device, or a given device model. When detected, the AI component 1304 can facilitate selecting modules from the library 322 and swapping modules to optimize operation of the device according to a given process task.

In yet another application, the AI component 1304 can be utilized to determine the best combination of module and sensor, or module and equipment, or device and equipment. Each device, although apparently manufactured with identical components can exhibit unique characteristics that differentiate one device from another both operationally and functionally. Thus, the AI component 1304 can monitor implementation of the device in a given configuration and determine where the device might be best suited for its determined characteristics. This also supports matching devices for use in the system and for given processes and equipment 304.

In still another implementation, the AI component 1304 interfaces with the rules engine 324 to employ selected rules based on operation of the process, devices, and equipment. The AI component 1304 facilitates intelligent corrections and adjustments of process conditions in realtime. Note that alternatively, or in combination with the remote AI component 1304, a local AI component 1306 can be employed to provide the same or similar functionality as the remote AI component 1304.

Figure 14:
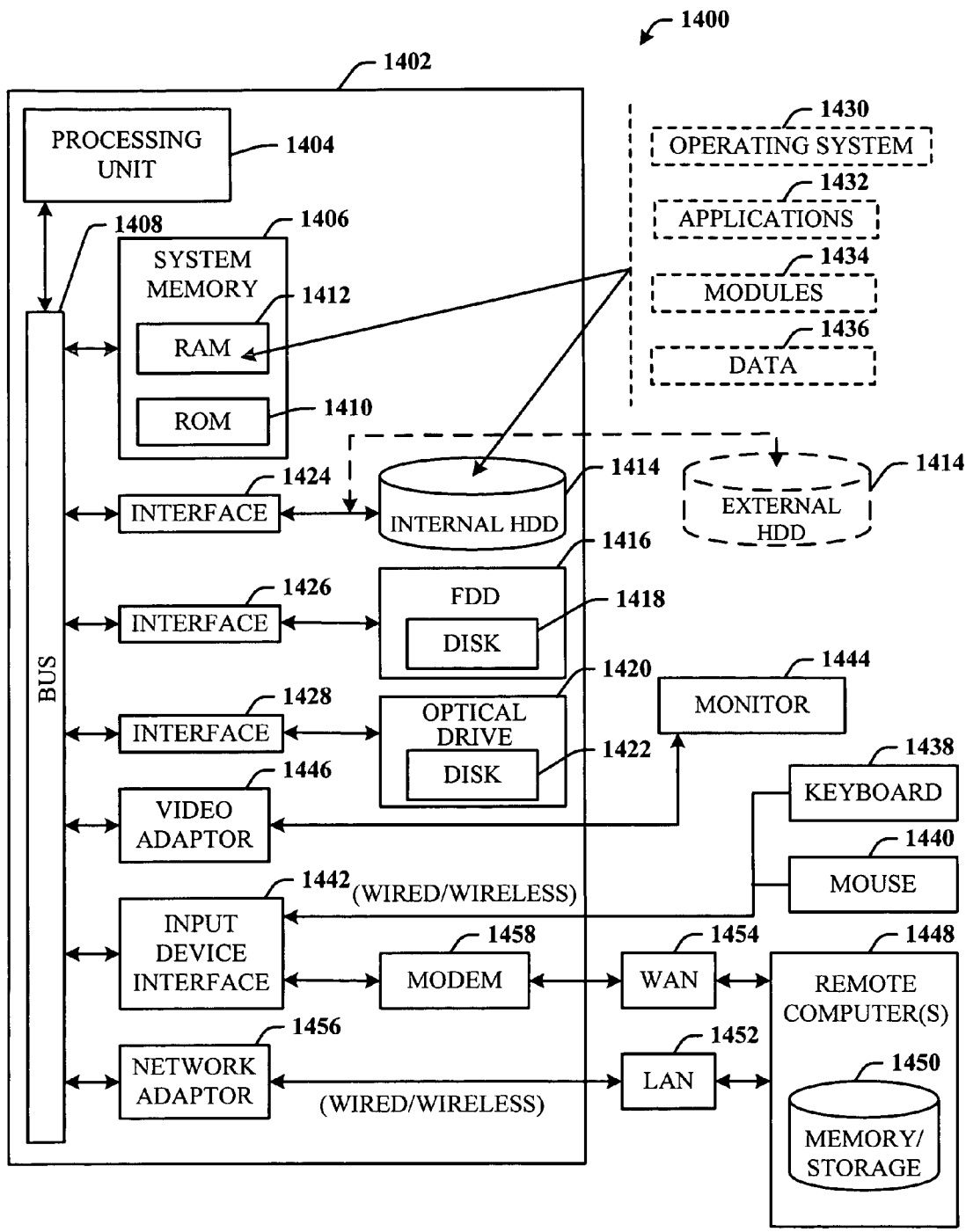
FIG. 14 illustrates a block diagram of a computer operable to execute the disclosed architecture.

Referring now to FIG. 14, there is illustrated a block diagram of a computer operable to execute the disclosed architecture. In order to provide additional context for various aspects of the subject invention, FIG. 14 and the following discussion are intended to provide a brief, general description of a suitable computing environment 1400 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, there is illustrated an exemplary environment 1400 for implementing various aspects of the invention that includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the invention can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates management of a semiconductor and/or microelectronics manufacturing process, comprising:
 a manufacturing component in communication with the semiconductor and/or microelectronics manufacturing process which operates according to conditions of the process, which manufacturing component at least one of monitors and controls the process using modularized code;
 a standards-based model employed to modularize control code into testable blocks such that higher order modules are built from tested, approved modules; and
 a rules engine component that processes one or more rules in association with the modularized code to affect conditions of the process in realtime.

2. The system of claim 1, wherein the modularized code is developed according to an ISA S88.01 standard.

3. The system of claim 1, wherein the manufacturing component includes a process control component that interfaces to the process and associated equipment for control thereof according to conditions of the process.

4. The system of claim 1, wherein the manufacturing component includes a data acquisition component that interfaces to the process and associated equipment for the measurement of data.

5. The system of claim 1, wherein the rules engine processes a prompt received from the manufacturing component in accordance with the one or more rules.

6. The system of claim 1, wherein the rules engine processes the one or more rules to prioritize resource utilization as requested by the manufacturing component.

7. The system of claim 1, further comprising a user interface that presents rules data that is representative of the one or more rules, and recipe information that is being processed.

8. The system of claim 7, wherein when a rule has completed processing, the user interface removes the associated rules data from being viewed.

9. The system of claim 1, further comprising a library of at least one of code modules and device information that is accessed to upload selected ones of the code modules into a device according to at least the device information.

10. A computer readable medium having stored thereon computer executable instructions for carrying out the components of claim 1.

11. The system of claim 1, further comprising an artificial intelligence component that employs a probabilistic and/or statistical-based analysis to prognose or infer an action that a user desires to be automatically performed.

12. The system of claim 1, wherein the one or more rules and the modularized code are processed together to optimize process flow through a piece of equipment associated with the process.

13. The system of claim 1, wherein the one or more rules and the modularized code are processed together to optimize process flow through groups of equipment associated with the process.

14. The system of claim 1, wherein the rules engine facilitates final product quality based upon compensation of variations of intermediate product quality.

15. The system of claim 1, wherein the rules engine processes a fuzzy rule set to effect process efficiency.

16. The system of claim 1, wherein the rules engine processes the one or more rules to balance process efficiency criteria and arrive at an optimal result.

17. A system that facilitates management of a manufacturing process, comprising:
 a manufacturing component in communication with a semiconductor and/or microelectronics manufacturing process which operates according to conditions of the process to output a product, which manufacturing component at least one of monitors and controls the process using modularized code;
 a standards-based model employed to modularize control code into testable blocks such that higher order modules are built upon tested and approved modules; and
 a rules engine component that processes one or more rules in association with the modularized code to control conditions of the process in realtime by balancing process efficiency criteria to arrive at an optimal result.

18. The system of claim 17, wherein the manufacturing component includes a process control component that interfaces to the process and associated equipment for control thereof according to conditions of the process, and a data acquisition component that interfaces to the process and associated equipment for the measurement of data.

19. The system of claim 17, wherein the rules engine utilizes a measure data to change conditions of the process.

20. The system of claim 17, wherein the rules engine processes the one or more rules to prioritize resource utilization as requested by the manufacturing component.

21. The system of claim 17, further comprising a user interface that presents rules data that is representative of the one or more rules being processed in realtime, and recipe information that is being processed by a batch engine.

22. The system of claim 17, wherein the one or more rules includes a fuzzy rule set which is processed with the modularized code to optimize process efficiency in the semiconductor and/or microelectronics process.

23. The system of claim 17, wherein the rules engine facilitates outputting the product having a product quality that is based upon compensation of variations of intermediate product quality.

24. A method of managing a semiconductor and/or microelectronics manufacturing process, comprising:
 managing the semiconductor and/or microelectronics manufacturing process in accordance with modularized code that operates on conditions of the process;
 modularizing the code utilizing a standards-based model such that higher order modules are developed from tested and approved modules;
 and
 processing a rule set in cooperation with execution of the modularized code to control conditions of the process in realtime and output a product.

25. The method of claim 24, further comprising processing a prompt in accordance with the rule set, which prompt is received from a batch engine.

26. The method of claim 24, further comprising acquiring data associated with the process that is used to control conditions of the process in realtime.

27. The method of claim 24, further comprising prioritizing resource utilization according to the rule set.

28. The method of claim 24, further comprising presenting at least one of rules processing information and recipe information via a graphical user interface.

29. The method of claim 24, further comprising controlling process efficiency of the process by optimizing process flow associated with groups of control devices and equip ment by assembling the modularized code into efficient sequences of code modules.

30. The method of claim 24, further comprising controlling process efficiency by processing the rule set with measure process data to change conditions of the process in realtime.

31. The method of claim 24, further comprising balancing process efficiency criteria using the rule set to output an optimal result that changes conditions of the process.

32. The method of claim 24, further comprising outputting the product based on an act of compensating for variations of an intermediate product.

33. The method of claim 24, further comprising optimizing the process by providing realtime streaming data that facilitates run-to-run comparison of process data.

34. The method of claim 24, further comprising at least one of the acts of:

applying statistical process control to the process;
applying an adaptive control technique;
enabling an e-diagnostic technique with security; and
providing genealogy for the product.

* * * * *